United States Patent
Lee et al.

(10) Patent No.: US 6,441,084 B1
(45) Date of Patent: Aug. 27, 2002

(54) SEMI-CONDUCTIVE COMPOSITIONS FOR WIRE AND CABLE

(75) Inventors: Chun D. Lee, Cincinnati; James J. Pickering, Mason, both of OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/547,278

(22) Filed: Apr. 11, 2000

(51) Int. Cl.⁷ ................................................ C08K 3/00
(52) U.S. Cl. ...................... 524/495; 524/496
(58) Field of Search .................. 524/495, 496

(56) References Cited

U.S. PATENT DOCUMENTS

| | | |
|---|---|---|
| 3,963,647 A | 6/1976 | Straub |
| 4,066,576 A | 1/1978 | Bork et al. |
| 4,265,789 A | 5/1981 | Christopherson et al. |
| 4,421,678 A | 12/1983 | Mehta |
| 4,493,788 A | 1/1985 | Fujie et al. |
| 4,545,926 A | 10/1985 | Fouts et al. |
| 4,585,578 A | 4/1986 | Yonahara et al. |
| 4,587,039 A | 5/1986 | Yamaoka et al. |
| 4,857,232 A | 8/1989 | Burns |
| 4,929,388 A | 5/1990 | Wessling |
| 4,971,726 A | 11/1990 | Maeno et al. |
| 5,174,924 A | 12/1992 | Yamada et al. |
| 5,214,091 A | 5/1993 | Tanaka et al. |
| 5,360,701 A | 11/1994 | Elton et al. |
| 5,476,612 A | 12/1995 | Wessling et al. |
| 5,484,838 A | 1/1996 | Helms et al. |
| 5,733,480 A | 3/1998 | Lee et al. |

OTHER PUBLICATIONS

Degussa Technical Bulletin Pigments: Pigment Blacks for Conductive Coatings; No. 65 (32 pages). Degussa AG, Germany.
Degussa Technical Bulletin Pigments: Carbon Black for Conductive Plastics; No. 69 (20 pages). Degussa AG, Germany.
Cabot Technical Report S–134: Special Blacks for Plastics (10 pages). Cabot Corporation, Special Blacks Division.
Cabot Technical Report S–39: Conductive Carbon Black in Plastics (15 pages). Cabot Corporation.
Columbian Chemicals Company: Using Raven Blacks in Plastics Applications (17 pages).

*Primary Examiner*—Edward J. Cain
(74) *Attorney, Agent, or Firm*—Gerald A. Baracka; William A. Heidrich

(57) ABSTRACT

Semi-conductive compositions useful for extrusion coating wire and cable are provided. The semi-conductive extrusion coating compositions of the invention utilize a base resin containing linear low density polyethylene and a combination of a higher structure conductive carbon black and a lower structure conductive carbon black. The linear low density polyethylene may be combined with other polyolefin resins, such as low density polyethylene. The resulting semi-conductive compositions have a useful balance of processability and thermomechanical stability and physical/mechanical properties making make them particularly well-suited for use as conductive layers for power cable constructions.

21 Claims, No Drawings

SEMI-CONDUCTIVE COMPOSITIONS FOR WIRE AND CABLE

BACKGROUND OF THE INVENTION

1. Field of the Invention

The invention relates to semi-conductive compositions useful for extrusion coating wires and cables. More specifically, the semi-conductive compositions of the invention are linear low density polyethylenes containing two or more different carbon blacks which impart a superior balance of properties, including dispersibility, moisture vapor transmission, environmental stress crack resistance, thermo-oxidative stability and physical/mechanical properties.

2. Description of the Prior Art

Linear low density polyethylene (LLDPE) is widely used in the wire and cable industry as a coating in electrical and telephone applications where flexibility, strength, low brittleness temperature and high resistance to abrasion are required. LLDPE has been found to be particularly useful for overhead and underground medium and low voltage power cable constructions. Power cables are multi-layer constructions of specifically formulated compositions which impart the requisite characteristics to the final construction and LLDPE-based compositions have been widely used for the conductor shield layer, the insulation shield layer and the exterior jacketing layer for such constructions. Conductor shield and insulation shield layers are semi-conductive and typically have large amounts of conductive carbon black compounded with the LLDPE. LLDPE-based jacketing compositions are usually non-conductive and generally contain about 2.5 to 3 percent conventional carbon black to provide protection against ultraviolet radiation.

While the use of smaller particle size carbon blacks generally provides increased electrical conductivity, these small particle size, high surface area blacks are more difficult to disperse in plastic materials. This is particularly true when using LLDPEs which are widely recognized as some of the more difficult polyolefin resins to process due to their narrow molecular weight distribution. Dispersibility of small particle size conductive blacks in LLDPE is even more of a problem when incorporating the higher black loadings typically required, e.g., 10–35 weight percent, for the manufacture of conductive compounds.

It would be highly useful, therefore, to develop LLDPE semi-conductive formulations having improved processability and extrudability for wire and cable applications. It would be even more advantageous and desirable if this could be accomplished while retaining or improving conductivity and the other properties generally considered to be essential for wire and cable applications. These and other advantages are realized with the LLDPE compositions of the present invention wherein a mixture of conductive carbon blacks with specific characteristics is utilized.

U.S. Pat. No. 5,733,480 discloses polyolefin compositions containing a mixture of conductive blacks having different structures useful for the extrusion of mono- and multi-layer films and coatings. The '480 compositions comprise conventional low density polyethylene (LDPE) resin having a density of 0.910–0.935 g/cm$^3$ and 6 to 15 weight percent of the carbon black mixture. Conventional LDPE resins are produced in high pressure polymerization processes and are homopolymers with substantial long-chain branching. LDPEs are distinguished from LLDPEs which are comprised of linear molecules with no long-chain branching. LLDPEs are produced by low pressure copolymerization of ethylene and one or more $C_{3-8}$ α-olefins and contain only short-chain branches as a result of the incorporated comonomer. While the reference does disclose that LLDPE and higher density PEs can be blended with the LDPE, the amount of these additive resins is preferably kept below 15 weight percent of the total polyolefin component. There is no suggestion in the reference to the use of mixed blacks with polyolefin compositions where LLDPE is the sole or predominant resin component or that LLDPE compositions useful for wire and cable applications exhibiting a superior balance of properties can be achieved by the use of a mixture of specific conductive carbon blacks.

SUMMARY OF THE INVENTION

The present invention relates to semi-conductive extrusion compositions having complex viscosities at 210° C. and 100 rad/sec from 6000 to 25000 poise and dispersion numbers from 50 to 700 psi comprising: (a) 75 to 95 weight percent, based on the total weight of the composition, of a base resin comprising linear low density polyethylene having a density from 0.890 to 0.925 g/cm$^3$ and melt index from 0.3 to 15 g/10 min and (b) 5 to 25 weight percent, based on the total weight of the composition, of a carbon black mixture containing a major portion of a higher structure conductive carbon black and a minor proportion of a lower structure conductive carbon black. Preferably, the higher structure black has a BET surface area greater than 500 m$^2$/g and dibutyl phthalate absorption number from 200 to 600 ml/g and the lower structure black has a BET surface area of 125 to 500 m$^2$/g and dibutyl phthalate absorption number of 80 to 250 ml/g.

In a highly useful embodiment of the invention the base resin is a mixture of linear low density polyethylene with another polyolefin, preferably low density polyethylene. It is particularly advantageous when the linear low density polyethylene is a copolymer of ethylene with 2 to 25 weight percent butene-1 or hexene-1. Another highly useful embodiment utilizes from 0.1 to 2.5 weight percent of a stabilizer which is a mixture of a hindered phenol and a mercaptobenzimidazole compound. Preferably, the weight ratio of hindered phenol to mercaptobenzimidazole compound is 1:1 to 1:4. Preferred semi-conductive extrusion compositions have complex viscosities from 8000 to 15000 poise, dispersion numbers from 50 to 350 psi.

DETAILED DESCRIPTION OF THE INVENTION

The present invention relates to semi-conductive LLDPE compositions for wire and cable applications. The LLDPE compositions of the invention contain a mixture of conductive carbon blacks which impart semi-conductivity and provide a balance of useful properties. The compositions are particularly useful as the semi-conductive layer in power cable constructions. In addition to having low resistivity, the semi-conductive formulations exhibit good processability and dispersion of the carbon black, low moisture vapor transmission, good low temperature properties and environmental stress crack resistance and good physical/ mechanical properties. Additionally, the compositions have good abrasion resistance and, when properly stabilized, good short and long-term oxidative stability.

To obtain compositions having the requisite properties, a base resin having LLDPE as the sole or predominant component is employed. LLDPE, which is typically produced by the copolymerization of ethylene with one or more $C_{3-8}$ α-olefins comonomers using transition metal catalysts in accordance with well-known processes, is characterized by linear molecules having no long-chain branching. Short-chain branching is instead present and is one of the primary determinants of resin density and physical properties.

LLDPE densities will range from 0.890 to 0.925 g/cm$^3$ and, more preferably, from 0.905 to 0.922 g/cm$^3$. Comonomers typically copolymerized with ethylene to obtain LLD- PEs useful for the invention include propylene, 1-butene, 4-methyl-1-pentene, 1-hexene, 1-octene and mixtures thereof. By incorporating these comonomers, linear polymer molecules having short-chain branches along the polymer backbone are produced. The amount of comonomer will typically not exceed 35 weight percent and, most commonly, the comonomer is present in an amount from about 2 to 25 weight percent of the polymer composition. The specific comonomer or comonomer mixture used is primarily based on process compatibility and the desired resin specifications. LLDPE resins which are copolymers of ethylene and butene-1 and/or hexene-1 have been found to be particularly advantageous when formulating of the semi-conductive compositions of the invention. Also, for best processability and extrudability it is advantageous if the LLDPE have a molecular weight distribution (MWD) greater than 10. MWD is determined from the weight average molecular weight (Mw) and number average molecular weight (Mn) which are obtained by gel permeation chromatography. MWD=Mw/Mn. LLDPEs useful for the invention are widely available from commercial sources.

As previously indicated, an LLDPE meeting the above criteria can constitute the sole component of the base resin or it can be combined with other polyolefin resins. If the LLDPE is combined with another resin, the LLDPE will constitute the major component of the blend, i.e., be present in an amount greater than 50 weight percent, based on the total weight of the base resin. Any additional resin(s) utilized with the LLDPE to obtain the base resin will be present in minor amounts, i.e., comprise less than 50 weight percent of the base resin.

Polyolefin resins which can be utilized with the LLDPE include homopolymers of ethylene, copolymers of ethylene and α-olefins and copolymers of ethylene and comonomers containing polar groups such as $C_{1-4}$ alkyl esters of acrylic and methacrylic acids. Ethylene-propylene copolymers are representative of ethylene/α-olefin copolymers which can be included in minor amounts. Copolymers of ethylene and polar comonomers, typically containing 1 to 35 weight percent and, more preferably, 2 to 25 weight percent comonomer, include by way of illustration ethylene/methyl acrylate and ethylene/n-butyl acrylate copolymers. In one highly useful embodiment of the invention, low density polyethylene homopolymers are employed to obtain the improved compositions of the invention. These LDPE homopolymers will generally have densities from about 0.910 to about 0.935 g/cm$^3$ and a melt index (MI) from 1 to 25 g/10 min. In one preferred embodiment, the polyethylene resin is LDPE having a density from 0.915 to 0.930 and MI from 2 to 12.

When the base resin is a mixture of LLDPE and another polyolefin, the polyolefin preferably will not exceed 40 weight percent of the mixture. Generally, the polyolefin will constitute from 2 up to about 35 weight percent and, more preferably, 5 to 30 weight percent of the base resin. Highly useful semi-conductive wire and cable compositions are obtained using base resin mixtures comprising 70 to 95 weight percent LLDPE and 5 to 30 weight percent LDPE.

The base resin, whether comprised only of LLDPE or a mixture of LLDPE with one or more other resins, will have a density of 0.890 to 0.925 g/cm$^3$ and MI from 0.3 to 15 g/10 min. Melt indexes are determined in accordance with ASTM Test Method D 1238. Densitities are determined in accordance with ASTM D 1505. Base resins having a density of 0.905 to 0.922 g/cm$^3$ and MI of 0.5 to 7.5 g/10 min are particularly advantageous for formulation of the semi-conductive compositions.

To obtain the improved semi-conductive compositions of the invention a mixture of at least two different carbon blacks is employed. The compositions will contain 75 to 95 weight percent base resin and 5 to 25 weight percent of the carbon black mixture. More preferably, from about 80 to 90 weight percent base resin and 10 to 20 weight percent of the carbon black mixture are employed.

The carbon black mixture contains at least two conductive blacks of different structure. The term "structure," as employed herein, refers to the ability of the black particles to associate and form larger three-dimensional aggregates. Structure, i.e., aggregate size and shape, can be determined by transmission electron microscopy but is more commonly defined by determining the volume of dibutyl phthalate (DBP) in ml. absorbed by 100 grams of the black. Carbon blacks with DBP absorption numbers less than about 80 are generally considered to have insufficient structure for semi-conductive applications. DBP absorption numbers greater than about 80 and, preferably, greater than 100 are typically regarded as high structure blacks suitable for semi-conductive formulations.

The first conductive black, referred to herein as the first or higher structure carbon black, in the carbon black mixture has a BET surface area greater than 500 m$^2$/g and DBP absorption number of 200 to 600 ml/100 g. A second conductive black with BET surface area 125 to 500 m$^2$/g and DBP absorption number 80 to 250 ml/100 g, referred to herein as the second or lower structure carbon black, is combined with the first black to obtain the carbon black mixture necessary to achieve the improved results of the invention. Both the higher and lower structure blacks have mean particle sizes from about 10 to 50 nm and volatiles contents typically 2 percent or below. More than one higher or lower structure black may be used if desired.

The relative amount of the higher and lower structure blacks in the mixture can be varied; however, the first (higher structure) black generally comprises more than 50 percent of the black mixture. Most generally, the black mixture will contain 51 to 85 weight percent higher structure black and 15 to 49 weight percent lower structure black. In one highly useful embodiment of the invention, the higher structure black constitutes 55 to 75 weight percent of the black mixture with the lower structure black comprising 25 to 45 weight percent.

It is particularly advantageous if the first black has a BET surface area of 600 to 2000 m$^2$/g, the second black has a BET surface area of 150 to 450 m$^2$/g and the volatiles content of both is less than 1.5 percent. In one highly useful embodiment, the higher structure black has a BET surface area of 750 to 1300 m$^2$/g and DBP absorption number of 300 to 500 ml/100 g and the second lower structure black has a BET surface area of 200 to 400 m$^2$/g and DBP absorption number of 100 to 200 ml/100 g.

Carbon blacks of the above types are known and available from commercial sources. For example, a representative high structure black which can be used for the invention is PRINTEX [trademark] XE 2 manufactured and sold by DeGussa Corporation, Pigments Group. Typical properties for this black, referred to by the manufacturer as an "extra" conductive black, are: volatiles 1.2 percent, particle size 35 nm, BET surface area 1000 m$^2$/g, and DBP absorption number 400 ml/100 g. Another higher structure black which meets the requirements of the invention is available from Cabot Corporation as BLACK PEARLS [trademark] 2000. This black has a BET surface are of 1475 m$^2$/g, DBP absorption number of 330 ml/100 g, volatiles content of 2.0 percent and particle size of 12 nm. A useful carbon black of lower structure which can be used as the second black in the mixture is PRINTEX [trademark] L 6, also manufactured by DeGussa Corporation, Pigments Group, which has a volatiles content of 1.2 percent, particle size of 18 nm, BET surface area of 265 m$^2$/g, and DBP absorption number of 120 ml/100 g. PRINTEX [trademark] L, available from DeGussa Corporation, Pigments Group, and having a BET surface area of 150 m²/g and DBP absorption number of 114 ml/100 g, and VULCAN [trademark] XC-72, available from Cabot Corporation and having a BET surface area of 254 m²/g and DBP absorption number of 178 ml/100 g, are examples of other conductive blacks which can be utilized as the second component in the carbon black mixture.

Uniform dispersion of the carbon black mixture in the base resin is necessary to provide the continuous path of conductive particles within the polymer matrix required to achieve maximum conductivity. Uniform dispersion is also essential for acceptable extrusion. Poor dispersion of black particles can restrict flow through dies resulting in of uneven thicknesses of extrudate and/or poor surface appearance. In extreme cases, poor dispersion of the black can result in blockage of screen packs which make it necessary to shut down the extrusion line until the blockage is removed. Processing conditions must be sufficient to adequately disperse the black but they cannot be so rigorous as to break down the carbon black structure, i.e., the aggregates. Excessive processing which breaks down the carbon black aggregates and results in diminished conductivity must be avoided.

To achieve proper dispersion of the carbon black mixture and insure acceptable conductivity and extrudability for wire and cable fabrication, the semi-conductive compositions of the invention have a specified complex viscosity and dispersion number. The compositions have complex viscosities from 6000 to 25,000 poise and, more preferably, 8000 to 15000 poise. If the complex viscosity is too high, the compositions are too stiff for acceptable extrusion. On the other hand, if the complex viscosity is too low the material does not have the necessary mechanical strength and extrudate surface quality will be poor. In a particularly useful embodiment of the invention, the complex viscosity is 9000 to 12000 poise. Complex viscosity measurements are conducted in accordance with ASTM Standards D 4065 Practice for Determining and Reporting Dynamic Mechanical Properties of Plastics and D 4440 Standard Practice for Rheological Measurement of Polymer Melts Using Dynamic Mechanical Procedures. Specifically, dynamic rheological measurements are obtained using a Rheometrics [trademark] RDA II instrument equipped with parallel plates. Measurements were made at 210° C. with a frequency sweep from 159 to 0.0398 rad/sec and strain of 5 percent. Complex viscosities reported herein are at 100 rad/sec.

The present compositions will also have dispersion numbers from about 50 to about 700 psi and, more preferably, from 50 to 500 psi. Dispersion number is an indication of the size and distribution of the carbon black agglomerates within the polymer matrix after processing. The method used to determine the dispersion number is analogous to the screen pack plugging test wherein change in head pressure in an extruder is measured as the composition is extruded. For the test a composition containing 10 weight percent carbon black is extruded using a Haake System 90 single screw extruder with a heated die (305° C.) with a breaker plate followed by a 60-60-325-60 mesh screen pack. Zones 1–3 in the extruder are heated to 235° C. and the extruder is operated at a screw speed of 150 rpm. The dispersion number is obtained by subtracting the pressure reading obtained at 5 minutes from the pressure reading obtained after 25 minutes. In a particularly useful embodiment of the invention the dispersion number of the composition is from 50 to 350 psi.

While it is not necessary, depending on the particular end use application, it may be advantageous to include one or more other additives in the compositions of the invention. In general, the type and amount of additive(s) will be consistent with conventional formulation practices employed with other polyolefin wire and cable compositions. Useful additives include but are not limited to antioxidants, such as hindered phenols, aromatic amines, thioethers, phosphites and phosphonites; processing aids such as fluoroelastomers; dispersing agents, such as stearic acid, waxes, calcium stearate, aluminum stearate and zinc stearate; and the like. These additives typically do not exceed about 1.5 weight percent of the total formulation and, most commonly, are employed at levels from 0.005 percent to about 1 percent. Fillers, such as calcium carbonate, talc, mica and the like may also be included in the formulations.

In one highly useful embodiment of the invention, a stabilizer combination comprised of a hindered phenol and a mercaptobenzimidazole compound is employed at levels from about 0.01 up to about 2.5 weight percent, based on the weight of the total composition, is employed. The weight ratio of the hindered phenol to the mercaptobenzimidazole compound will range from about 1:1 to about 1:4 and, more preferably, be in the range 1:2 to 1:3. It is particularly advantageous when the stabilizer combination is utilized in an amount from about 0.1 to 1.5 weight percent.

Useful mercaptobenzimidazole compounds correspond to the formula

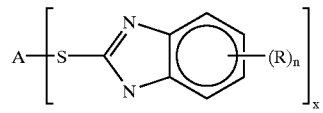

where A is hydrogen or zinc, R is a $C_{1-4}$ alkyl group, n is 0 to 4 and x is 1 or 2. Preferably, R is methyl and n is 0 or 1. Preferred mercaptobenzimidazole compounds based on their commercial availability include 2-mercaptotolylimidazole (MTI), 2-mercaptobenzimidazole (MBI), zinc 2-mercaptobenzimidazole (ZMBI) and zinc 2-mercaptotolylimidazole (ZMTI). MTI is particularly advantageous.

Useful hindered phenols will contain one or more substituted phenyl groups of the formula

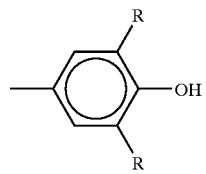

where R is a $C_{1-4}$ alkyl group and, most preferably, a tertiary butyl group. Where more than one, 3,5-dialkyl-4-hydroxyphenyl group is present, they will be joined through a linking group and the resulting compounds will correspond to the formula

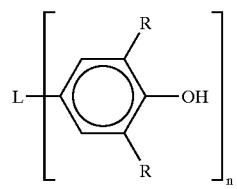

where n is an integer from 2 to 4 and L represents the linking group.

Representative linking groups can include:

—CH₂—

C (CH₂OCCH₂CH₂) ₄ —

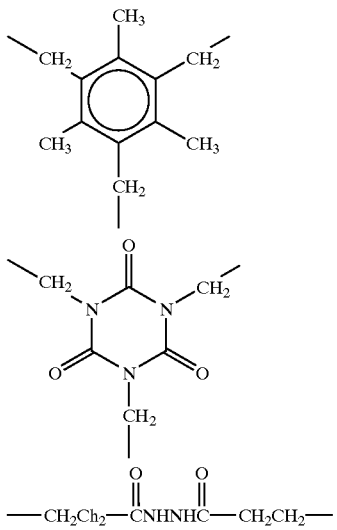

It is especially advantageous when the above-identified linking moieties are substituted with 3,5-di-t-butyl-4-hydroxyphenyl groups.

Representative hindered phenol compounds of the above types include:
4,4'-methylenebis(2,6-di-t-butylphenol);
tetrakis[methylene (3,5-di-t-butyl-4-hydroxyhydrocinnamate)methane;
1,3,5-trimethyl-2,4,6-tris(3,5-di-t-butyl-4-hydroxybenzyl)-benzene;
1,3,5-tris(3,5-di-t-butyl-4-hydroxybenzyl)-s-triazine 2,4,6 (1H,3H,5H)trione;
N,N'-bis[3 -(3, 5-di-t-butyl-4-hydroxyphenyl)propanyl]-hydrazine;
octadecyl 3,5-di-t-butyl-4-hydroxyhydrocinnamate.

All of the foregoing materials are commercially available. Tetrakis[methylene (3,5-di-t-butyl-4-hydroxyhydrocinnamate)]methane and octadecyl 3,5-di-t-butyl-4-hydroxyhydrocinnamate are particularly useful in combination with MTI.

The following examples illustrate the invention more fully. Unless otherwise indicated, all parts and percentages reported in the examples are on a weight basis. Except for varying the amount and type of base resin, carbon black mixture and additives, all of the formulations were prepared and evaluated using the same procedures.

The formulations were compounded using a Farrel OOC Banbury mixer having a capacity of 2400 cc. All of the ingredients, i.e., polyolefin(s), carbon black(s) and stabilizer(s) were combined and the preheated (95° F.) chamber filled with the mixture. A pressure of 40 psi was then applied with mixing (125 rpm). When flux was achieved, i.e., the temperature of the mixture in the chamber reached approximately 270° F. (usually about 40–50 seconds), the ram was raised for 15 seconds and any material which collected in the throat of the mixer was scraped into the mixing chamber. Pressure was reapplied and mixing continued for at least 3 minutes or until the temperature reached 340° F. The melt was then pelletized at 360° F. using a 3.25 inch single screw extruder (L/D=23; 10 rpm) connected to an underwater pelletizer.

Complex viscosity ($\eta^*$), which provides a measure of processability by determining the Theological properties of molten polymers over a range of temperatures by non-resonant forced vibration techniques, was determined in accordance with ASTM Test Methods D 4065 and D 4440 utilizing a Rheometrics [trademark] RDA II rheometer equipped with parallel 25 mm diameter plates and operated at 210° C. with a frequency sweep from 159 to 0.0398 rad/sec and strain of 5 percent. Complex viscosities are reported at a frequency of 100 rad/sec.

Dispersion number (DN) was determined utilizing a screen pack plugging procedure wherein the change in head pressure in an extruder is measured over time. The test was conducted using a Haake System 90 single screw extruder with a heated (305° C.) die with a breaker plate followed by a 60-60-325-60 mesh screen pack. Extruder zones 1–3 were heated to 235° C. and the extruder was operated at a screw speed of 150 rpm. Pressure readings (in psi) were taken at 5 and 25 minutes and the dispersion number is the difference between the readings, i.e., $DN=P_{t25}-P_{t5}$. For uniformity of comparison, all dispersion numbers are reported for a 10 weight percent carbon black loading. Thus, if a composition was formulated at a black level greater than 10 percent, it was let down into additional amount of the polyolefin resin to adjust the carbon black loading to 10 percent before conducting the pressure rise test and determining the dispersion number.

Conductivity was determined in accordance with ASTM Test Method D991 which measures volume resistivity of a sample. Since resistivity is the reciprocal of conductivity, lower volume resistivity values reflect improved conductivity. In some instances resistance was also measured using a Fluke digital ohm meter Model 87III.

Measurements we made at room temperature and at 90° C. on 40 mil plaques with the electrodes 1 cm apart. Plaques used for the 90° C. test were allowed to equilibrate at that temperature for 4 hours before testing. Flexural Modulus (1% Secant) was determined following ASTM D790. Elongation at break was determined on extruded film in accordance with ASTM D 638. Environmental stress crack resistance (ESCR) a was determined in accordance with ASTM D1693. Water Vapor Transmission rates (WVTR) were determined using ASTM F372. Thermomechanical stability of the compositions was determined by monitoring variation in torque as a heated sample is mixed under high shear. For this test, a 40 gram sample of the composition is placed in the mixing chamber of a Haake Rheomix heated to 220° C. and operating at 60 rpm for a period of 50 minutes. Initially, the torque drops as the mixture melts but then the torque gradually increases due to chain extension reactions. The value reported is the torque at 40 minutes normalized with respect to the initial torque. The lower the torque value, the more thermally stable the composition.

EXAMPLE I

A composition was prepared in accordance with the invention using a base resin comprised of 76 percent LLDPE (density 0.920 g/cm$^3$; MI 0.7 g/10 min) and 24 percent LDPE (density 0.918 g/ cm$^3$; MI 7 g/10 min). The LLDPE used as an ethylene/butene-1 copolymer. The base resin was compounded with a mixture of two conductive carbon blacks having different structures, a stabilizer package and processing aid. The carbon black mixture was comprised of 57 percent PRINTEX XE2 Extra Conductive Black and 43 prcent PRINTEX L6 conductive Black available from DeGussa Corporation, Pigments Division. The first higher structure black, i.e., XE2, had a BET surface are of 1000 m$^2$/g, DBP absorption number of 400 ml/100 g particle size distribution of 35 nm and volatiles content of 1.2 percent. The second lower structure black had a BET surface area of 265 m$^2$/g. DBP adsorption number of 120 ml/100 g particle size distribution of 18 nm and volatiles content of 1.2 percent. The overall composition of the formulation was as follows:

| | |
|---|---|
| LLDPE | 64.8% |
| LDPE | 20.0% |
| Carbon Black Mixture | 14% |
| Zinc Stearate | 0.4% |
| Hindered Phenol* | 0.3% |
| MTI | 0.5% |

*Octadecyl 3,5-di-butyl-4-hydroxyhydrocinnamate (IRGANOX 1076).

* Octadecyl 3,5-di-t-butyl-4-hydroxyhydrocinnamate (IRGANOX 1076).

The resulting compound formulation had a density of 0.985 g/cm$^3$, complex viscosity of ($\eta$*) of 10100 poise and dispersion number of 240 psi.

The composition was tested for percent elongation, flexural modulus, environmental stress crack resistance (ESCR), water vapor transmission rate (WVTR), conductivity and thermomechanical stability. Values were as follows:

| | |
|---|---|
| Elongation | 700% |
| Flexural Modulus | 70000 psi |
| ESCR | >500 hours |
| WVTR | 0.31 g/m$^2$/day on 32 mils |
| Torque | 1.04 |
| Volume Resistivity (ASTM D991) | −0.818 log ohms-cm |
| Volume Resistivity (RT) | 3.54 log ohms-cm |
| Volume Resistivity (90° C.) | 3.76 log ohms-cm |

The above formulation meets all of the specifications generally considered to be necessary by the industry for compositions targeted for semi-conductive wire and cable applications, e.,g. flex modulus >50000; ESCR>500; WVTR<40; DN<500; $\eta$*<25000; and volume resistivity (ASTM D 991) <−0.020.

The composition exhibited good processability and was readily extrudable to provide a smooth extrudate free of surface defects. For example, 18 AWG copper wire was insulated with a 40 mil thick layer of the composition. The extrusion coating process was carried out using a 2.5 inch diameter single screw Davis Standard extruder (L/D=25) with a 100 mil die and the following temperature profile:

| | |
|---|---|
| Zone 1 | 177° C. |
| Zone 2 | 204° C. |
| Zone 3 | 227° C. |
| Zone 4 | 237° C. |
| Adapter | 248° C. |
| Die 1 | 248° C. |
| Die 2 | 248° C. |

No operating problems were encountered and the insulation had a smooth, shiny surface. The insulation layer had an elongation greater than 700 percent at break. Upon visual inspection of the surface of the insulated wire, no pimples or specks caused by poor or non-uniform black dispersion were apparent.

Comparative Example A

Example I was repeated except that the amounts of the different types of blacks used in the carbon black mixture were reversed. For this composition the mixture contained 43 percent of the higher structure black (XE 2) and 57 percent of the lower structure black (L6). While the resulting formulation had acceptable processability, as evidenced by a complex viscosity ($\eta$*) of 8900 poise, carbon black dispersion was marginal (DN=420 psi) and conductivity was reduced to an unacceptable level. Volume resistivity was −0.013 log ohm-cm.

EXAMPLE II

The following composition was prepared following the procedure of Example

| | |
|---|---|
| LLDPE | 84.8% |
| Carbon Black Mixture | 14% |
| Zinc Stearate | 0.4% |
| Hindered Phenol | 0.3% |
| MTI | 0.5% |

All of the components used were the same as described in Example I. The composition was stiffer and therefore not as easily processable but otherwise met all of the aforementioned criteria for semi-conductive applications. Key properties were as follows:

| | |
|---|---|
| Flexural Modulus | 76000 psi |
| ESCR | >500 hrs |
| WVTR | 0.21 |
| $\eta$* | 15000 poise |
| Volume Resistivity | −0.35 log ohm-cm |

Processability of the above formulation is enhanced when an LLDPE having an MI from 1 to 5 g/10 min with a broader molecular weight distribution used.

EXAMPLE III

To demonstrate the ability to vary the ratio of higher to lower carbon blacks within the prescribed limits, Example I was repeated using a carbon black mixture containing 71 weight percent XE 2 and 29 weight percent L6. The resulting formulation had a complex viscosity ($\eta$*) of 23000 poise, dispersion number (DN) of 360 psi and volume resistivity of −1.5 log ohm-cm. These results point out the versatility of the invention, i.e., that by varying the ratio of the two blacks within the prescribed limits it is possible to adjust the overall balance of properties while still meeting the generally recognized target specifications.

Comparative Example B

To demonstrate importance of maintaining the amounts of LLDPE and LDPE within the prescribed limits when base resin blends are employed, Example I was repeated except that the amount of LDPE was increased. The formulation was as follows:

| | |
|---|---|
| LLDPE | 44.8% |
| LDPE | 40% |
| Carbon Black Mixture | 14% |
| Zinc Stearate | 0.4% |
| Hindered Phenol | 0.3% |
| MTI | 0.5% |

All of the ingredients used were the same as in Example I. While the total amount of base resin (LLDPE+LDPE) was the same, the percentages of LLDPE and LDPE were 53 percent and 47 percent, respectively. The composition had acceptable processability ($\eta$*=62000 poise) and black dispersion (DN=230 psi) and conductivity was within the prescribed limits; however, ESCR and WVTR were reduced to unacceptable levels. ESCR for the composition was only 250 hours and the WVTR was 0.42.

Comparative Example C

This comparative example is presented to demonstrate the improved results obtained using hindered phenol/mercaptobenzimidazole stabilizer combinations. The formulation was identical in all respects to that of Example I except that the MTI was replaced with an identical amount of a second hindered phenol. The second hindered phenol was tetrakis[methylene(3,5-di-t-butyl-4-hydroxyhydrocinnamate)]methane (IRGANOX 1010) a well-known phenolic stabilizer compound commonly used in combination with other hindered phenols to stabilize polyolefin resins and, in some instances, known to produce synergistic results. Removal of the ZMTI produced a significantly stiffer formulation ($\eta^* = 10700$ poise) with unacceptable carbon black dispersion (DN=860 psi). The composition also had poorer volume resistivity (−0.066 log ohm-cm) and thermomechanical stability (torque=1.72) than the inventive composition of Example 1.

We claim:

1. A semi-conductive extrusion composition having a complex viscosity at 210° C. and 100 rad/sec from 6000 to 25000 poise and dispersion number from 50 to 700 psi comprising: (a) 75 to 95 weight percent, based on the total weight of the composition, of a base resin comprising linear low density polyethylene having a density from 0.890 to 0.925 g/cm$^3$ and melt index from 0.3 to 15 g/10 min and (b) 5 to 25 weight percent, based on the total weight of the composition, of a carbon black mixture containing a major portion of a higher structure conductive carbon black and a minor proportion of a lower structure conductive carbon black.

2. The composition of claim 1 wherein the higher structure conductive carbon black has a particle size of 10 to 50 nm, BET surface area greater than 500 m$^2$/g, dibutyl phthalate absorption number from 200 to 600 ml/100 g and volatiles content of 2 percent or less and the lower structure conductive carbon black has a particle size of 10 to 50 nm, BET surface area of 125 to 500 m$^2$/g, dibutyl phthalate absorption number of 80 to 250 ml/100 g and volatiles content of 2 percent or lower.

3. The composition of claim 1 having a complex viscosity from 8000 to 15000 poise and dispersion number from 50 to 500 psi.

4. The composition of claim 1 wherein the base resin comprises 80 to 90 weight percent of the total composition and the carbon black mixture comprises 10 to 20 weight percent of the total composition.

5. The composition of claim 1 wherein the linear low density polyethylene is a copolymer of ethylene and up to 35 weight percent $C_{3-8}$ $\alpha$-olefin comonomer.

6. The composition of claim 5 wherein the $\alpha$-olefin comonomer is butene-1.

7. The composition of claim 5 wherein the $\alpha$-olefin comonomer is hexene-1.

8. The composition of claim 5 wherein the linear low density polyolefin has a density of 0.905 to 0.922 g/cm$^3$.

9. The composition of claim 8 wherein the LLDPE is a copolymer of ethylene and 2 to 25 weight percent butene-1.

10. The composition of claim 2 wherein the carbon black mixture is comprised of 51 to 85 weight percent based on the total weight of the carbon black mixture, higher structure black and 15 to 49 weight percent, based on the total weight of the carbon black mixture, lower structure black.

11. The composition of claim 10 wherein the higher structure black has a BET surface area of 600 to 2000 m$^2$/g and the lower structure black has a BET surface area of 150 to 450 m$^2$g.

12. The composition of claim 11 wherein the higher structure black constitutes 55 to 75 weight percent of the mixture and has a dibutyl phthalate absorption number of 150 to 450 ml/100 g.

13. The composition of claim 5 wherein the base resin is a mixture of 65 to 98 weight percent linear low density polyethylene and 2 to 35 weight percent polyolefin selected from the group consisting of ethylene homopolymers, copolymers of ethylene and $\alpha$-olefin and copolymers of ethylene and comonomers containing polar groups.

14. The composition of claim 13 wherein the polyolefin is an ethylene homopolymer having a density from 0.910 to 0.935 g/cm$^3$ and melt index from 1 to 25 g/10 min.

15. The composition of claim 14 wherein the linear low density polyethylene comprises 70 to 95 weight percent of the base resin and the polyolefin comprises 5 to 30 weight percent of the base resin.

16. The composition of claim 15 wherein the linear low density polyethylene has a density of 0.905 to 0.922 g/cm$^3$ and the ethylene homopolymer has a density from 0.915 to 0.930 and melt index from 2 to 12.

17. The composition of claim 1 which additionally containing from 0.1 to 2.5 weight percent, based on the total weight of the compositions, of a stabilizer comprising a mixture of a hindered phenol and mercaptobenzimidazole compound of the formula

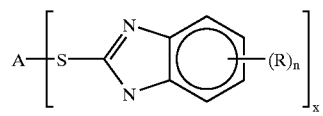

where A is hydrogen or zinc, R is a $C_{1-4}$ alkyl group, n is 0 to 4 and x is 1 or 2.

18. The composition of claim 17 wherein the stabilizer constitutes 0.1 to 1.5 weight percent of the composition.

19. The composition of claim 17 wherein R is methyl and n is 0 or 1.

20. The composition of claim 17 wherein the stabilizer is a mixture of a hindered phenol and 2-mercaptotolylimidazole at a weight ratio from about 1:1 to 1:4, respectively.

21. A semi-conductive extrusion composition having a complex viscosity of 8000 to 15000 and dispersion number from 50 to 500 psi comprising (a) 75 to 95 weight percent, based on the total weight of the composition, of a base resin having a density of 0.905 to 0.922 g/cm$^3$ and melt index from 0.5 to 7.5 g/10 min comprising 70 to 95 weight percent, based on the weight of the base resin, linear low density polyethylene copolymer and 5 to 30 weight percent, based on the weight of the base resin, low density polyethylene homopolymer and (b) 7 to 18 weight percent based on the total weight of the composition of a carbon black mixture comprised essentially of (I) 51 to 85 weight percent, based on the total weight of the carbon black mixture, of a higher structure conductive black having a particle size of 10 to 50 nm BET surface area greater than 500 m$^2$/g, dibutyl phthalate absorption number from 200 to 600 ml/100 g and volatiles content less than 2 percent and 15 to 49 weight percent, based on the total weight of the carbon black mixture, of a lower structure carbon black having a particle size of 10 to 50 nm, BET surface area of 125 to 500 m$^2$/g, dibutyl phthalate absorption number of 80 to 250 ml/100 g and volatiles content of 2 percent or below.

* * * * *